United States Patent [19]

Mann

[11] 4,120,380
[45] Oct. 17, 1978

[54] OILER FOR MOTORCYCLE DRIVE CHAINS

[76] Inventor: David R. Mann, 12 Weymouth St., Apt. 8, Portland, Me. 04101

[21] Appl. No.: 807,811

[22] Filed: Jun. 20, 1977

[51] Int. Cl.² .............................................. F16N 7/10
[52] U.S. Cl. ................................... 184/15 R; 184/28; 222/509
[58] Field of Search ................. 184/15 R, 15 B, 15 A, 184/28; 74/611; 222/509

[56] References Cited

U.S. PATENT DOCUMENTS

| 3,229,859 | 1/1966 | Conroy et al. | 222/509 X |
| 3,503,470 | 3/1970 | Lister | 184/15 R X |
| 3,724,582 | 4/1973 | Wood | 184/15 R X |
| 3,828,890 | 8/1974 | Schott et al. | 184/15 R |
| 3,896,901 | 7/1975 | Ango | 184/15 R |
| 3,934,677 | 1/1976 | Schott et al. | 184/15 R |

FOREIGN PATENT DOCUMENTS

| 284,244 | 11/1952 | Switzerland | 184/15 |
| 806,462 | 12/1958 | United Kingdom | 184/15 |

Primary Examiner—David H. Brown

[57] ABSTRACT

An oiler for a motorcycle chain has a container for an oil can the discharge therefrom controlled by a plunger exposed at one end. The container has a port and includes an open-ended chamber which the can fits and a cap provided with a lever yieldably held in a first inoperative position and moved into a second position by means operated by the operator and in the second position the plunger is actuated to effect oil discharge through a conduit extending through the container port. The container is attachable to the frame of the motorcycle in a position such that discharged oil is delivered to a course of the chain.

7 Claims, 8 Drawing Figures

U.S. Patent  Oct. 17, 1978  4,120,380
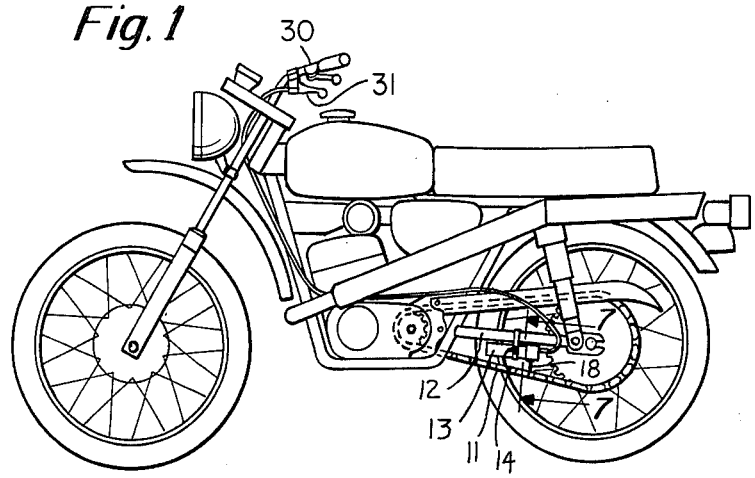
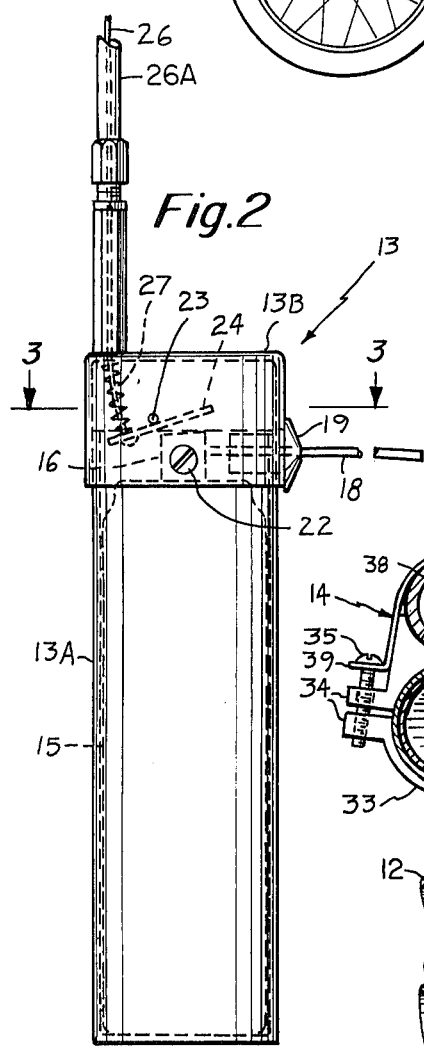
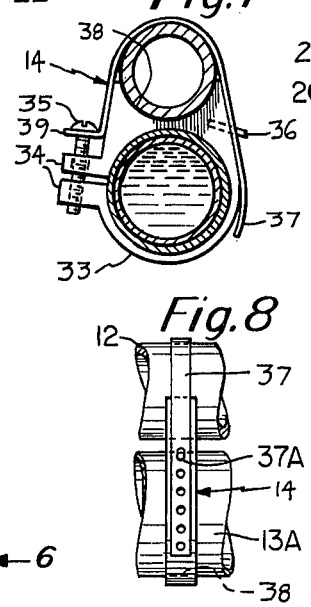
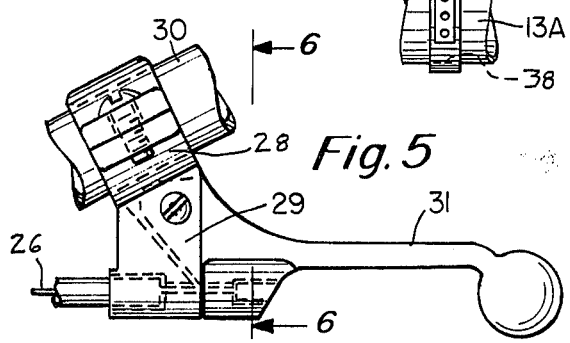
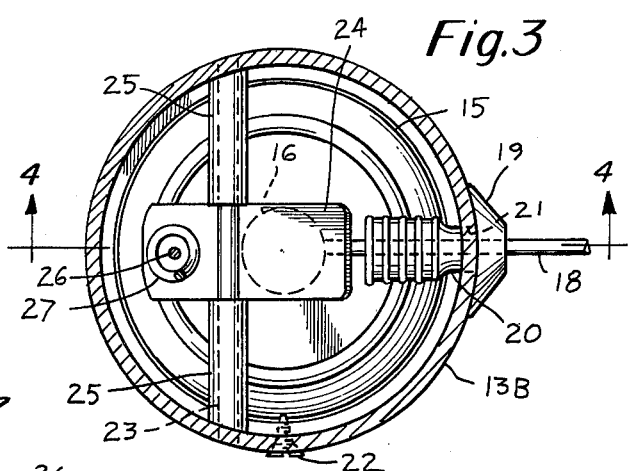
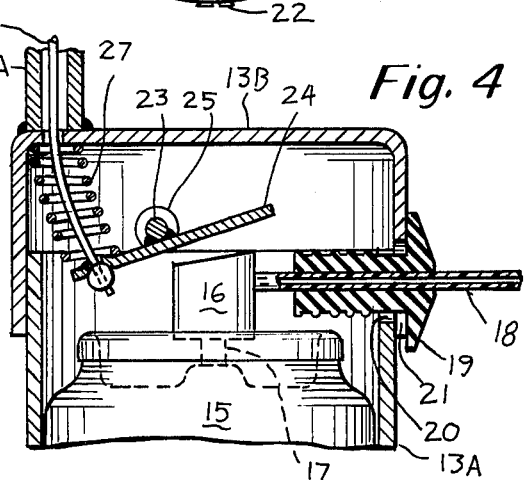
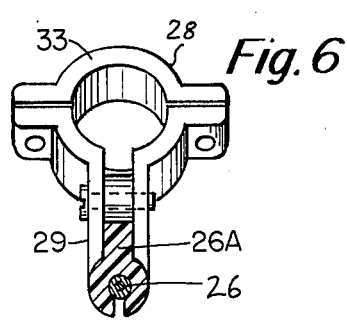

OILER FOR MOTORCYCLE DRIVE CHAINS

BACKGROUND REFERENCES

U.S. Pat. No. 508,485
U.S. Pat. No. 1,998,682
U.S. Pat. No. 3,012,632
U.S. Pat. No. 3,720,289
U.S. Pat. No. 3,939,730

BACKGROUND OF THE INVENTION

One of the most obvious requirements of motorcycle maintenance is that of proper lubrication of the drive chain or chains. Without adequate lubrication, the life of such chains is noticeably shortened and is a prime cause of chain breaks.

While service manuals prescribe appropriate chain care and while proposals have been made for chain oilers having a reservoir and operator controlled means to control the discharge therefrom, as far as I am aware, however, chain oilers have not been accepted by motorcyclists.

One reason for the non-acceptance of chain oilers is that special oils are provided that are most effective in meeting requirements of chain lubrication and such are available in pressurized cans of a convenient size and of a type having a plunger-operated discharge. While such cans are easy and economical to use and enable a spray to be directed against the chain to ensure proper oil distribution, one may forget to use such a can at an appropriate time or not have it with him when chain lubrication is needed.

THE PRESENT INVENTION

The general objective of the present invention is to provide motorcycle chain oilers that are attachable to the frame of a motorcycle and use, as their oil reservoirs, cans of the appropriate oil and of the above referred-to plunger-operated type that can be easily installed in the oiler and as easily removed and replaced when empty with the oiler provided with means operable by the operator to actuate the plunger in control of the oil discharge from the can whenever chain oiling is wanted.

In accordance with the invention, this objective is attained with an oiler having a container attachable to a motorcycle frame and provided with a port. The container has an open-ended chamber dimensioned to accommodate the oil can with its plunger exposed and a removable cap provided with a lever. Means connected to the lever are operable to move the lever between a first inoperative position in which it is yieldably held by a spring and a second position in which the plunger is actuated to effect oil discharge by operator controlled means. An oil discharge conduit connected to the discharge port of the can extends through the container port and the container is attached to the motorcycle frame in an appropriate position such that the conduit is disposed to discharge oil against a course of the chain.

While an oiler in accordance with the invention can be used when the plunger of the can effects a pumping action, it is preferred that the invention be used with pressurized oil cans for maximum effectiveness and convenience.

Another objective of the invention is to provide means by which the oiler can be easily and safely operated by the operator of the motorcycle, an objective attained by having such means include a flexible cable connected to the plunger actuating lever. A clamp attached preferably to the handlebar of the motorcycle has a manually operable lever pivotally connected thereto and the other end of the cable and the cable is secured between its ends to the motorcycle to ensure that it cannot interfere in any way with the operator.

BRIEF DESCRIPTION OF THE DRAWINGS

In the accompanying drawings, a preferred embodiment of the invention is disclosed and FIG. 1 is a side elevation of a motorcycle provided with a chain oiler in accordance with the invention;

FIG. 2 is a side elevation of the oiler;

FIG. 3 is a section, on an increase in scale, taken approximately along the indicated line 3—3 of FIG. 2;

FIG. 4 is a section taken approximately along the indicated line 4—4 of FIG. 3;

FIG. 5 is a side view of the handlebar attachment;

FIG. 6 is a section taken approximately along the indicated line 6—6 of FIG. 5;

FIG. 7 is a section taken approximately along the indicated line 7—7 of FIG. 1, showing the clamp securing the oiler to the motorcycle frame; and FIG. 8 is a side elevation of that clamp by itself.

THE PREFERRED EMBODIMENT OF THE INVENTION

In FIG. 1, the left hand side of a motorcycle, generally indicated at 10 is shown with one course of its drive chain 11 above and the other course below a frame member 12.

A chain oiler in accordance with the invention has a container, generally indicated at 13 and consisting of a cylindrical chamber 13A and a cap 13B. The chamber 13A is secured to the frame member 11 as by clamps 14 and is dimensioned to slidably receive a can 15 of pressurized oil that can be discharged through a port in the head 16 of a plunger 17 when the plunger 17 is depressed with the discharge continuing until the plunger is released to return to its normal position. Such cans are conveniently available and are widely used by motorcyclists.

In accordance with the invention, the can 15 has a flexible discharge tube 18 secured in the discharge port of the plunger head 16 and extending through a seal 19 slidable in a slot 20 in the open end of the chamber 13A.

The container cap 13B has a like seal-receiving slot 21 and is detachable secured to the chamber 13A as by a screw 22. A pivot 23 extends transversely of the interior of the cap 13B at one side of and parallel to a vertical transverse plane inclusive of the axis of the container and a lever 24 is carried by the pivot 23 and held centered as by sleeves 25. One end of the lever overlies the plunger head 16.

A flexible cable 26, the length of which varies with the make of the motorcycle, has its sheath 26A secured to the cap 13B and extends into the cap 13B and through a coil spring 27 and is anchored to the other end of the lever 24 with the spring 27 seated thereagainst and backed by the cap 13B to yieldably hold the lever 24 in its first or inoperative position.

It will be apparent that a pull on the cable 26 will so pivot the lever 24 as to bring it into its second position in which the plunger 15 is so depressed that oil is discharged through the tube 18 and against the course of the chain 11 towards which it is directed. In order to effect such a pull, a holder 28 includes a clamp 29 and is secured to the handlebar 30 (either the left or the right hand side) where the operator can easily and safely engage and depress the lever 31 pivotally connected thereto and to which the other end of the cable 26 is anchored with its sheath 26A held by the clamp 29 of the holder 28.

It is preferred that the clamps 14 be of the type shown in FIGS. 7 and 8 where the clamp 14 is shown as including a split ring section 33 dimensioned to slidably receive the cylindrical chamber 13B and provided with bosses 34 having vertically aligned bores threaded to receive the screw 35 by which the bosses 34 may be drawn together to secure the chamber 13A within the section 33. Opposite the bosses 34, the section 33 has an anchor 36 of a type to catch in a selected one of a series of holes 37A extending lengthwise of a flexible metal strap 37. Between the bosses 34 and the anchor 35, the section 33 has an arcuate seat 38 for the frame member 12. The strap 37 extends about the frame member 12 and has a shouldered end 39 through which the screw 35 also extends thus enabling the clamp to be securely attached both to the chamber 13A and the frame member 12 at the same time.

I claim:

1. An oiler attachable to a frame member of a motorcycle and for use in lubricating the motorcycle chain with an oil can, the can of the type having an outlet the discharge through which is effected by the operation of a plunger exposed at one end of the can, said oiler including a container for said can and having a port and attachable to the frame member adjacent a course of said chain, said container comprising an open-ended chamber dimensioned to slidably receive said can with the plunger exposed and a cap removably attached to said chamber and dimensioned to receive the plunger within it, a lever pivotally supported in said cap, means connected to and operable to move said lever between a first inoperative position and a second position in which the lever moves the plunger to effect the discharge of oil, said means including a spring yieldably maintaining said lever in said first position and operator controlled means to effect the second lever position, and an oil delivery conduit connected to the outlet of the can and extending through the port of the container and disposed to deliver oil, when the plunger is activated, to said chain course.

2. The oiler of claim 1 in which the operator controlled means includes a flexible cable one end of which is connected to said lever, and a clamp attachable to a handlebar includes a lever to which the other end of the cable is attached.

3. The oiler of claim 1 in which a pivot extends transversely of the cap on one side of a transverse vertical plane inclusive of the axis of the container, one end of the lever is engageable with the plunger and the operator controlled means includes a cable connected to the other end of the lever.

4. The oiler of claim 3 in which the spring is a coil spring between said other end of the lever and the cap and the cable extends through the spring.

5. The oiler of claim 1 and clamp means attached to the container and attachable to the motorcycle frame member.

6. The oiler of claim 5 in which the clamp means includes at least one clamp, said clamp including a split ring section slidably receiving said container and having a seat for the frame member, and bosses, a screw is threaded through said bosses and operable to draw said bosses towards each other to secure the container in said section, a flexible metal strap attached to said section opposite said bosses and disposed about the frame member and including a shouldered end through which said screw extends thus enabling said screw to draw the strap into clamping engagement with the frame member.

7. The oiler of claim 6 in which the metal strap has a lengthwise series of holes and the ring section includes an anchor detachably receiving a selected one of said holes.

* * * * *